United States Patent
Vogt et al.

(10) Patent No.: US 12,326,420 B2
(45) Date of Patent: Jun. 10, 2025

(54) MOUNTING ARRANGEMENT WITH A VIBRONIC SENSOR

(71) Applicant: Endress+Hauser SE+Co. KG, Maulburg (DE)

(72) Inventors: Thomas Vogt, Maulburg (DE); Ira Uppenkamp, Wehr (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 293 days.

(21) Appl. No.: 18/068,627

(22) Filed: Dec. 20, 2022

(65) Prior Publication Data

US 2023/0204543 A1    Jun. 29, 2023

(30) Foreign Application Priority Data

Dec. 23, 2021   (DE) .............. 10 2021 134 449.2

(51) Int. Cl.
*G01N 29/02* (2006.01)
*G01N 29/22* (2006.01)

(52) U.S. Cl.
CPC .......... *G01N 29/02* (2013.01); *G01N 29/022* (2013.01); *G01N 29/222* (2013.01); *G01N 2291/022* (2013.01)

(58) Field of Classification Search
CPC .... G01N 29/02; G01N 29/022; G01N 29/222; G01N 2291/022
See application file for complete search history.

(56) References Cited

U.S. PATENT DOCUMENTS

| | | | |
|---|---|---|---|
| 2008/0060844 A1* | 3/2008 | Teske ............... | A61N 1/372 174/110 A |
| 2009/0120169 A1 | 5/2009 | Chandler, Jr. et al. | |
| 2009/0181289 A1* | 7/2009 | Traulsen ............ | H01M 50/571 427/535 |
| 2014/0192836 A1* | 7/2014 | Neilson ............... | G01N 29/036 374/28 |

FOREIGN PATENT DOCUMENTS

| | | | | |
|---|---|---|---|---|
| DE | 3233234 A1 | | 3/1984 | |
| DE | 102015112055 A1 | | 1/2017 | |
| DE | 102016107414 A1 | * | 10/2017 | ............ A61N 1/375 |
| EP | 1507133 A2 | | 2/2005 | |
| GB | 2321107 A | | 7/1998 | |
| JP | 2020504431 A | * | 2/2020 | |

OTHER PUBLICATIONS

DE-102016107414-A1, English Translation (Year: 2017).*
JP-2020504431-A, English Translation (Year: 2020).*

* cited by examiner

Primary Examiner — Ryan D Walsh
(74) Attorney, Agent, or Firm — Mark A. Logan; Endress+Hauser (USA) Holding, Inc.

(57) ABSTRACT

A mounting arrangement comprises a vibronic sensor and a flange having an opening for transmitting signals through the flange, wherein the vibronic sensor has a vibronic measuring sensor, especially an oscillatable unit, and a measuring transducer, which are arranged on different sides of the flange. The vibronic sensor has a glass feed-through for the signal line between the measuring sensor and the measuring transducer, and the glass feed-through is arranged at least in regions in the opening of the flange.

7 Claims, 4 Drawing Sheets

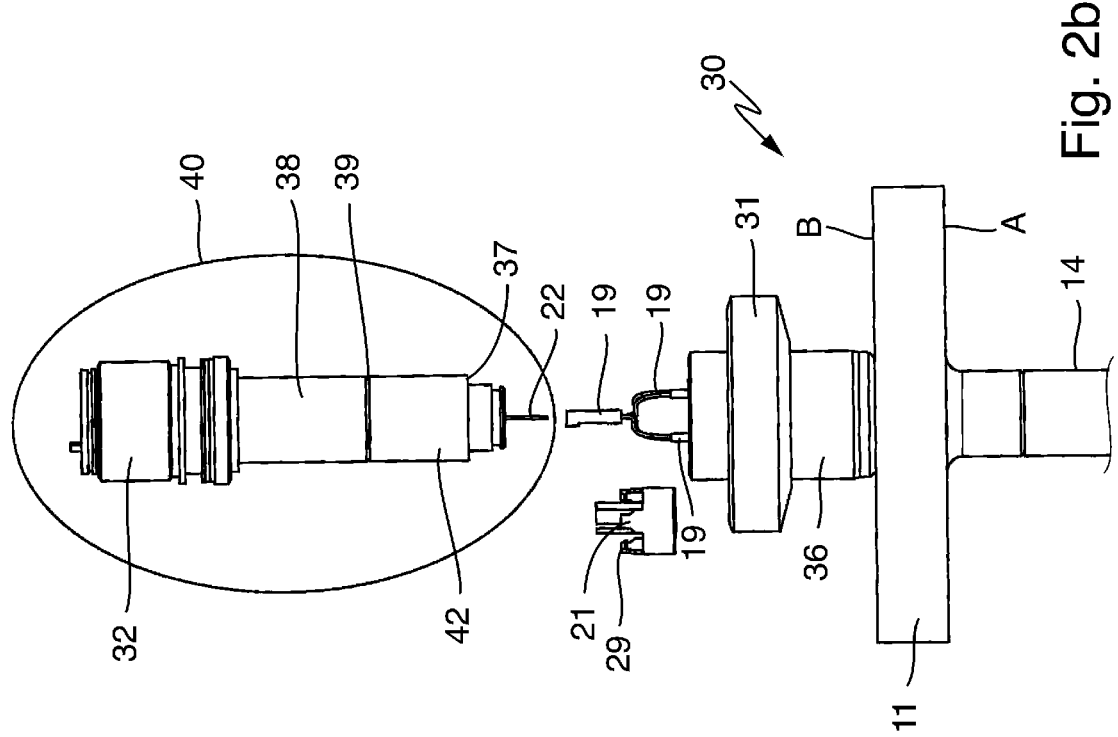
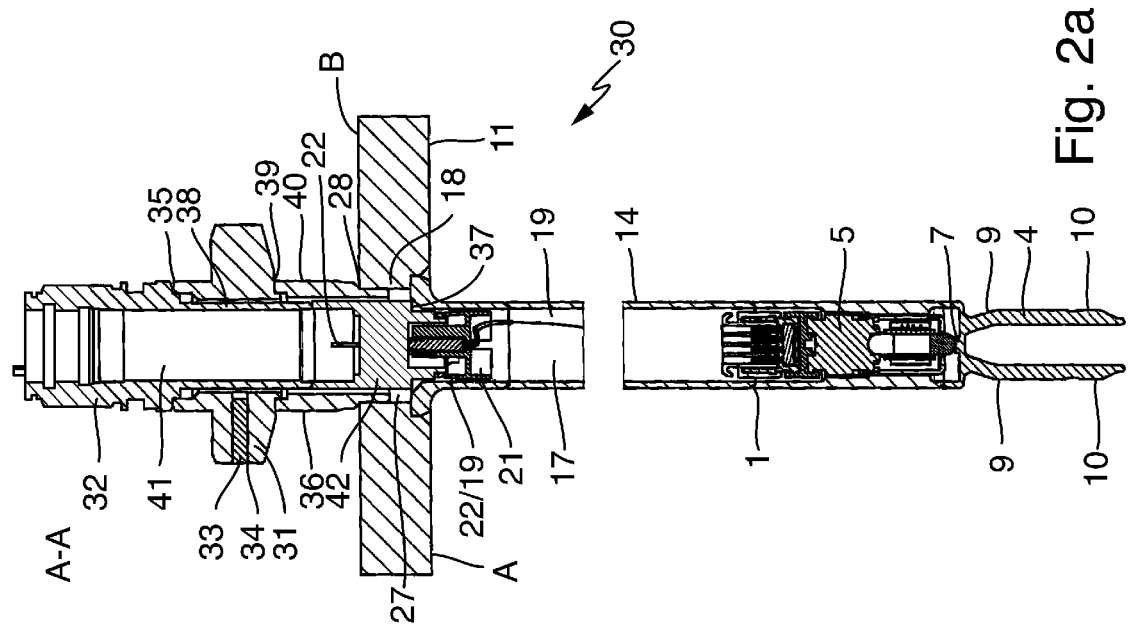
Fig. 2a
Fig. 2b

MOUNTING ARRANGEMENT WITH A VIBRONIC SENSOR

CROSS-REFERENCE TO RELATED APPLICATION

The present application is related to and claims the priority benefit of German Patent Application No. 10 2021 134 449.2, filed on Dec. 23, 2021, the entire contents of which are incorporated herein by reference.

TECHNICAL FIELD

The present disclosure relates to a mounting arrangement comprising a vibronic sensor.

BACKGROUND

Two typical mounting arrangements of vibronic sensors according to the prior art are shown in FIGS. 3 and 4, FIG. 3 thereby shows a pressure-tight mounting arrangement 100 and FIG. 4 shows a gas-tight mounting arrangement 200, respectively with a vibronic sensor 101, 201.

Given mounting arrangements of the generic type, if used in aggressive process media, for example corrosive process media, this can result in the partial dissolving of the measuring sensor-side sensor elements, and to an intrusion of this process medium into the tubular shaft and the tube volume of the sensor. From there, the process medium can then pass through the tube volume and through the opening of the flange, dissolve the wall of the tubular shaft on the measuring transducer side, and thereby ultimately arrive into the open while bypassing the container wall.

SUMMARY

Starting from the aforementioned prior art, it is an object of the present disclosure to provide a mounting arrangement having greater process safety, especially given use of limit level measurement with corrosive media.

The present disclosure achieves this object via the mounting arrangement and via a use of a mounting arrangement.

A mounting arrangement according to the present disclosure comprises a vibronic sensor and a flange with an opening. Signal lines, e.g., cables from the process side to a measuring transducer, can be guided through the opening.

The vibronic sensor has a vibronic measuring sensor, especially an oscillating fork, and a measuring transducer.

The measuring sensor and the measuring transducer are typically arranged on different sides of the flange.

The vibronic sensor additionally has a glass feed-through for the signal line between the measuring sensor and the measuring transducer. This glass feed-through is arranged at least in regions in the opening of the flange.

Similar to a plug, the glass feed-through closes the flange opening in the event of corrosive damage to the measuring sensor or to the tubular shaft arranged thereon, so that the corrosive process medium must overcome the solid flange in order to arrive into the open. In the meantime, countermeasures can be taken.

This reconfiguration of the previous measurement configuration allows the process safety of the mounting arrangement to be increased without a complete redesign of the existing mounting arrangement being necessary.

Other advantageous embodiments of the present disclosure are the subject matter of the dependent claims.

The vibronic sensor can have at least one tubular shaft which extends into or through the opening of the flange. The glass feed-through is thereby inserted into the tubular shaft or placed onto the tubular shaft.

The glass feed-through can advantageously be connected positively or non-positively to a strain-relief plug coupling, especially via latching elements. This enables quick and uncomplicated mounting of the glass feed-through and at the same time offers a positioning aid.

The mounting arrangement can advantageously be designed to be pressure-tight but not gas-tight, wherein the glass feed-through is inserted into a tubular shaft. Given this variant, the glass feed-through can be protected against a linear displacement at the end on one side by an axial stop, and can be clamped on the other side, especially by a seal, in a tubular shaft.

At one end, the glass feed-through can be integrally joined, especially welded, preferably so as to be flush, along an annular surface with a tubular connector piece of a first adapter component of the tubular shaft to form a structural unit. This variant enables a gas-tight integration of the glass feed-through into a tubular shaft. The structural unit, composed of the glass feed-through together with the tubular connector piece, can define a medium-tight internal tube volume in which a signal line is arranged between the glass feed-through and the measuring transducer.

The flange can have a cylindrical opening into which the structural unit is at least partially inserted.

An adapter component, especially the first adapter component, can additionally have an evacuation opening into which a dowel pin is inserted.

An adapter component can especially be integrally connected to the flange.

The volume of glass in the glass feed-through can preferably extend at least over 15%, especially preferably over 20-50%, of the longitudinal extent of the glass feed-through.

Furthermore according to the present disclosure is a use of a mounting arrangement according to the present disclosure for detecting the limit level of a corrosive medium.

BRIEF DESCRIPTION OF THE DRAWINGS

In the following, the subject matter of the present disclosure is explained in detail using an exemplary embodiment and with the aid of accompanying Figures. The following are shown:

FIG. 2a shows sectional view of a second variant of a mounting arrangement according to the present disclosure;

FIG. 2b shows side view of the mounting arrangement of FIG. 2b, in partial section;

DETAILED DESCRIPTION

Figure 3:
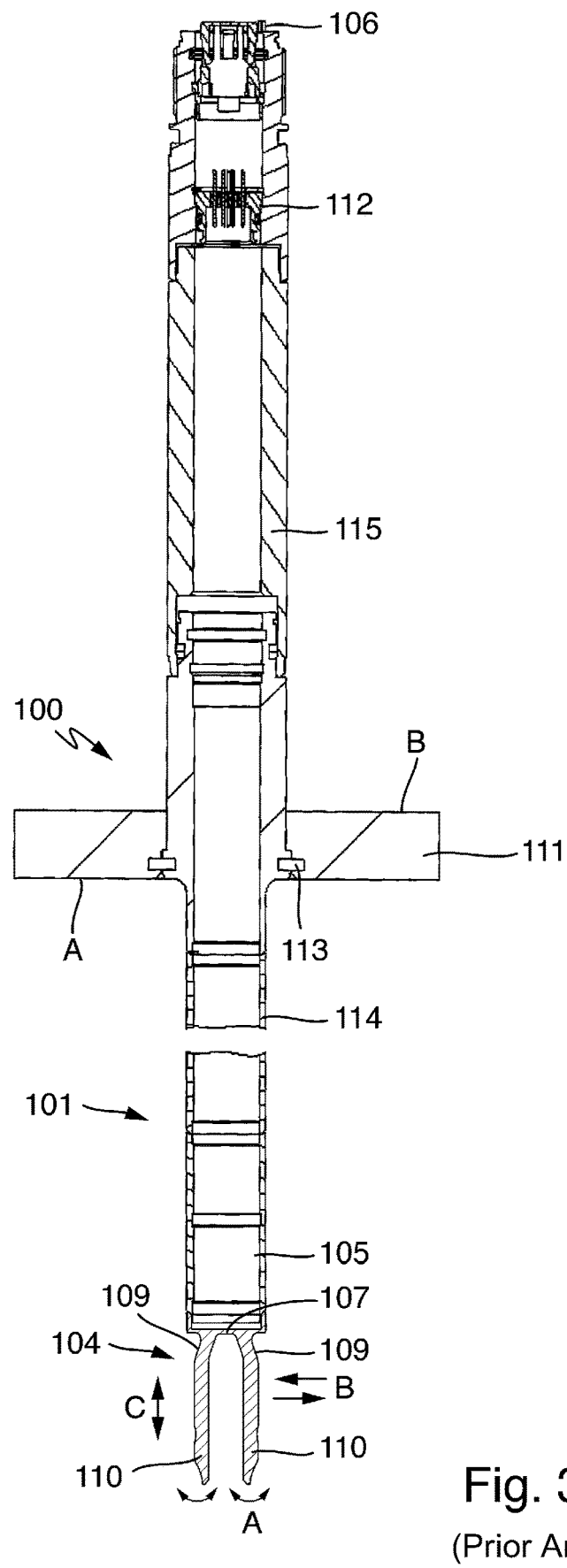
FIG. 3 shows side view of a first mounting arrangement according to the prior art.

Shown in FIG. 3 is a mounting arrangement 100 with a vibronic sensor 101. An oscillatable unit 104 in the form of an oscillating fork is depicted. According to the nomenclature of process metrology, this oscillatable unit represents a measuring sensor. Since this variant of the oscillatable unit is used most often, the entire following description relates to an oscillating fork. However, the subject matter of the present disclosure is not limited to the variant of an oscillating fork, but rather encompasses all known types of an oscillatable unit.

The oscillating fork is excited to mechanical vibrations by means of an electromechanical transducer unit 105, which is charged with an excitation signal and can be, for example, a piezoelectric stack or bimorph drive. However, it is naturally understood that other embodiments of a vibronic sensor also fall under the present disclosure. Furthermore, an electronic coupling 106 is shown for connection to an electronics unit, by means of which the signal evaluation and/or feed takes place. This electronic unit is also referred to as a measuring transducer.

In FIG. 3, the oscillating fork is developed in the form of a sensor element, which is commonly known as a product of the applicant under the product name LIQUIPHANT. A membrane 107 and an oscillating element 108 connected thereto can be seen. The oscillating element has two oscillating rods 109 on which a paddle 110 is respectively integrally formed at the end. In operation, the oscillating fork 104 executes oscillation movements corresponding to the vibration mode with which it is excited. The different oscillation modes are depicted by arrows in FIG. 3. The arrows respectively indicate the respective essential directions of movement of the oscillating fork 104 for the fundamental mode A, as well as for the first B and second C higher oscillation modes. Each of the two oscillating rods 109 behaves essentially like what is known as a flexural resonator. In the fundamental mode, the two oscillating rods 109 oscillate in counterphase with respect to one another.

In addition to the vibronic sensor 101, the assembly arrangement 100 also comprises a flange 111 for connecting to a counter-flange, for example on a tube or a container for forming a flange coupling.

The vibronic sensor 101 comprises a first tubular shaft 114 on a measuring sensor side A of the flange 111, and a second tubular shaft 115 on the measuring transducer side B. The tubular shafts 114 and 115 are typically used for process decoupling between measuring sensor and measuring transducer, so that the sensitive measuring transducer electronics are not influenced by the process temperature or other process conditions. The tubular shafts 114 and 115 can be connected to one another in one piece, and are connected to the flange 111 via an interface, for example a screw connection or a welded joint. A tube volume 117 is thereby provided which extends from the first tubular shaft 114, through the flange 111, into the second tubular shaft 115.

A glass feed-through 112 is arranged in the second tubular shaft 115, just below the electronic coupling for the measuring transducer. Glass feed-throughs have long been known in many fields of process metrology. They are used as signal conductors between two cavities, wherein a pressure tightness between the cavities is simultaneously enabled. Given the variant of FIG. 3, the glass feed-through 112 is only inserted and secured against axial displacement in the second tubular shaft 115. This variant is thus designed to be pressure-tight, but not gas-tight.

Figure 4:
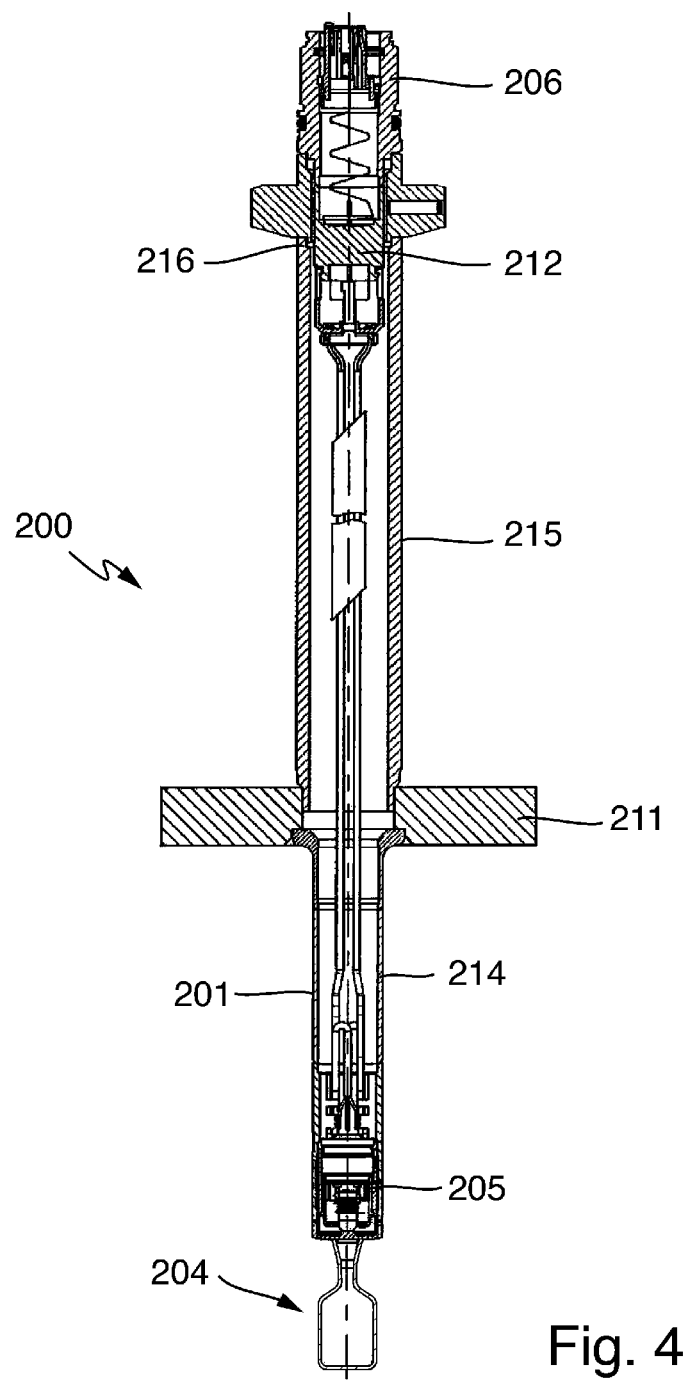
FIG. 4 shows side view of a second mounting arrangement according to the prior art.

In the variant of FIG. 4, a second variant of a known mounting arrangement 200 is shown. The mounting arrangement likewise comprises a vibronic sensor 201 and a flange 211. The vibronic sensor 201 comprises an oscillatable unit 204 in the form of an oscillating fork, as well as an electromechanical transducer unit 205 for generating an excitation signal, an electronic coupling 206 for connection to an electronics unit, and a tube comprising a first and second tubular shaft 214 and 215 for connecting the oscillatable unit 204 to the electronic coupling 206. In this variant as well, the vibronic sensor 201 has a glass coupling 212 which is arranged in the tube in a gas-tight manner with a weld seam 216.

Figure 1B:
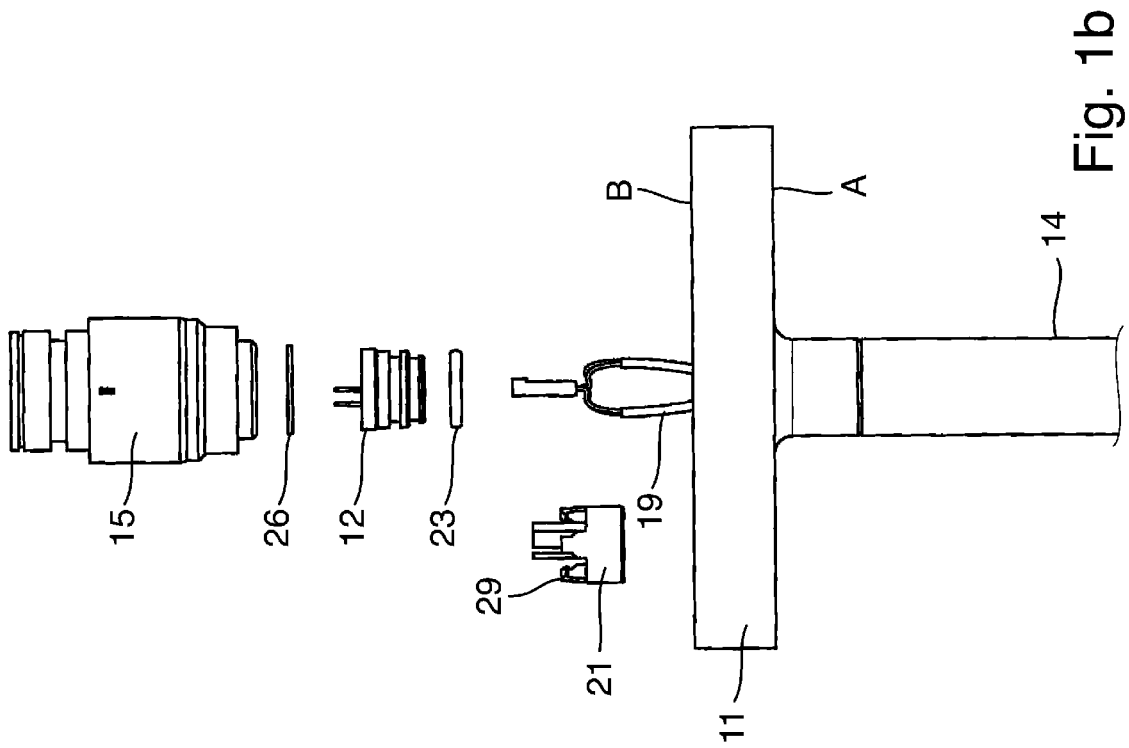
FIG. 1b shows side view of the mounting arrangement of FIG. 1a, in partial section.
Figure 1A:
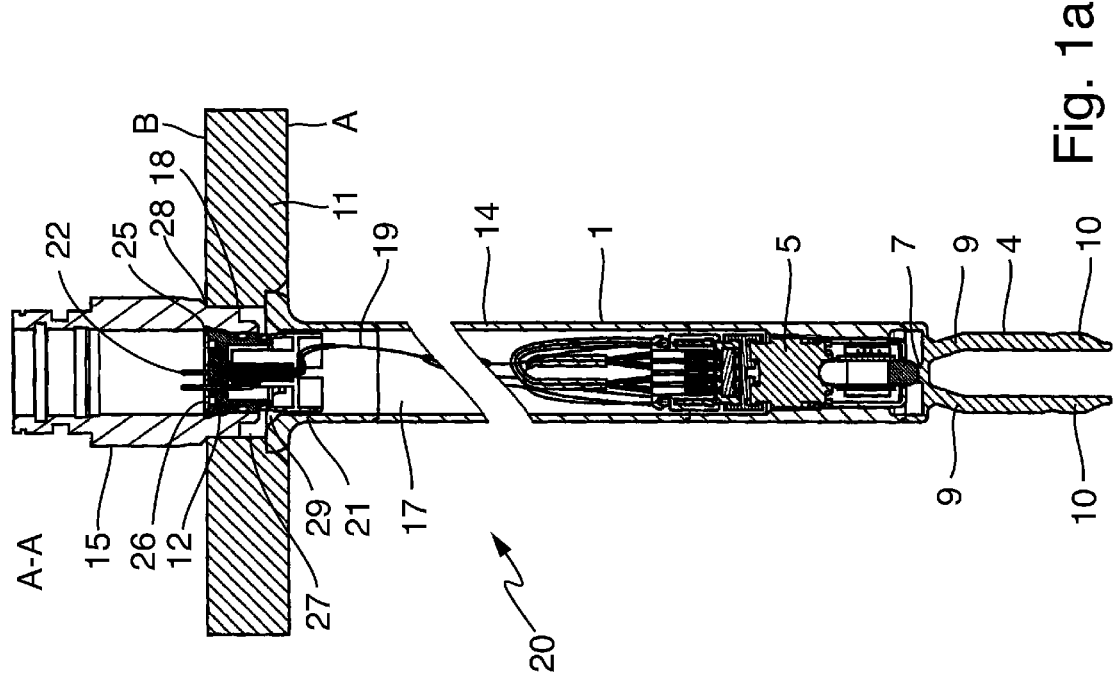
FIG. 1a shows sectional view of a first variant of a mounting arrangement according to the present disclosure.

FIGS. 1*a* and 1*b* show a mounting arrangement 20 according to the present disclosure. The mounting arrangement, analogous to FIGS. 3 and 4, thereby has a vibronic sensor 1 and a flange 11. Analogous to FIGS. 3 and 4, the vibronic sensor 1 has a membrane 7 as well as oscillating rods 9 with paddles 10. The vibronic sensor 1 comprises an oscillatable unit 4, an electromechanical transducer unit 5, an electronic coupling (not shown), as well as a first and second tubular shaft 14 and 15 for connecting the oscillatable unit 4 to the electronic coupling, wherein a tube volume 17 extends from the first tubular shaft 14, through the flange 11, into the second tubular shaft 15.

The two tubular shafts 14 and 15 are thereby inserted into an opening 18 of the flange 11, or placed over an opening of the flange 11, and connected, especially welded, to the flange.

The second tubular shaft 15 is shown as an adapter in FIG. 1, but can be extended by a further tubular connector piece or else can be directly connected to a measuring transducer. The tubular shaft 15 is fixed with the flange 11 by a circumferential weld seam 28.

In the tube volume 17, signal lines 19 run from the electromechanical transducer unit 5 in the region of the first tubular shaft 14, which signal lines can be combined to form a cable assembly for simple handling.

The signal lines 19 are connected to a glass feed-through 12 via a plug coupling 21 for strain relief. The glass feed-through 12 has electrical line elements in the form of metal pins 22 which are arranged in a glass matrix.

The metal pins 22 may be executed as a nickel-iron alloy. Preferably, the metal pins 22 may additionally be tin-plated.

The glass feed-through 12 has, in a manner known per se, an outer sleeve made of any material, for example metal or ceramic, and a filling volume of glass which is arranged within the sleeve. The glass is especially an inorganic glass. The filling volume of glass thereby extends preferably at least over 15%, especially preferably over 20-50%, of the longitudinal extent of the outer sleeve.

The glass feed-through 12 is inserted into an end region of the second tubular shaft 15 and sealed via an O-ring 23. A groove 25, into which a locking ring 26 engages, is provided along the inside of the tubular shaft 15. After assembly or insertion of the glass feed-through 12 into the tubular shaft 15, this locking ring 26 can be inserted into the groove 25. The locking ring 26 then acts as a stop for the glass feed-through 12. A clamping of the glass feed-through 12 in the tubular shaft 15 can take place via the O-ring 23.

A gap 27 is arranged within the opening 18, between the first and second tubular shafts 14 and 15, wherein the glass feed-through 12 can extend partially into the gap 27. The plug coupling 21 is positioned in the end region of the first tubular shaft 14.

The plug coupling 21 and the glass feed-through 12 are connected to one another by clamping and/or latching means 29. A latching of the two components 12 and 21 is thereby especially preferred.

The connection of the two components 12 and 21 thereby preferably takes place in the region of the gap 27. The metal pins are oriented parallel to the tube axis of the second tubular shaft 15 and protrude on both sides in segments at least from the fill volume of glass. The connection to the signal lines 19 shown in FIG. 1 takes place via the metal pins on one side of the glass feed-through 12, and to further signal lines (not shown) on the other side of the glass feed-through 12, so that an electrical connection for signal transmission and/or power supply between the transducer unit 5 and a measuring transducer (not shown in FIG. 1) is ensured. The variant of FIG. 3 is pressure-tight, but not gas-light. This variant is applied primarily given mounting arrangements 20 with coated sensors 1.

FIGS. 2a and 2b show a second mounting arrangement 30 according to the present disclosure in a gas-tight embodiment. Components which are structurally identical to FIGS. 1a and 1b are provided with identical reference signs.

The components of the vibronic sensor 1 on the measuring sensor side A are identical to FIGS. 1a and 1b. However, in order to achieve a gas-tight embodiment, the glass feed-through 42 has a stepped design and can rest with stops 37 along end faces of the first tubular shaft 14.

Like the tubular shaft 15 of FIGS. 1a and 1b, the second tubular shaft 40 serves to connect to the measuring transducer. It is constructed in several parts in FIGS. 2a and 2b. It has a first adapter component 32, a second adapter component 31 with an evacuation opening 34, and a third adapter component 36. The three adapter components are welded to one another in a gas-tight manner by weld seams 35, 39.

The evacuation opening is sealed in an airtight manner by a dowel pin 33 and an additional optional weld. The first adapter component 32 has a tubular connector piece 38 which projects into the lumen of the second adapter component 31 and is joined, especially welded, at the end to the glass feed-through 42. Accordingly, the combination of adapter component 32 with the tubular shaft 38 and with the glass feed-through 42 has an inner tube volume 41. This inner tube volume 41 can also be evacuated.

Analogous to the variants of FIGS. 1a and 1b, the glass feed-through 42 has metal pins 22 which protrude on both sides from the glass feed-through 42. The lumen between the tubular connector piece 38 and the second adapter component 31 is additionally evacuated by suction through the evacuation opening 34. The tubular shaft 40 can be connected to the flange 11 via a weld seam 28, analogous to FIGS. 1a and 1b. The double-walled structure of the tubular shaft 40 enables a gas-tight embodiment of the second tubular shaft 40 and of the mounting arrangement 30 overall.

In FIG. 2b, the protruding ends of the metal pins 22 are connected to a cable assembly of the signal lines 19. The variant illustrated in FIGS. 2a and 2b welds and forms the glass feed-through in a gas-tight manner.

This embodiment/glass feed-through can also be used, inter alia, in high-temperature applications.

The special feature of the variants according to the present disclosure of FIGS. 1a and 1b, and 2a and 2b, is that the glass feed-through 12, 42 is at least in regions on a with the flange 11, 41.

If a comprehensive decomposition of individual sensor elements of the measuring sensor side A occurs, for example due to an aggressive process medium, this process medium cannot escape via the flange opening 18 and by decomposition of the wall of the second tubular shaft 15, 40. Rather, the flange 11 serves as a cover in such an event, and the glass feed-through 12, 42 acts like a glass stopper in the flange 11, which prevents the process medium from escaping over a certain period of time.

The invention claimed is:

1. A mounting arrangement, comprising:
a vibronic sensor, including:
a vibronic measuring sensor;
a connection to a measuring transducer;
a signal line between the vibronic measuring sensor and the measuring transducer; and
a glass feed-through for the signal line; and
a flange having an opening for transmitting signals through the flange,
wherein the vibronic measuring sensor and the connection to the measuring transducer are arranged on different sides of the flange,
wherein the vibronic sensor further includes a tubular shaft that extends in or through the opening of the flange, wherein the tubular shaft includes a first adapter component having a tubular connector piece,
wherein the glass feed-through is inserted into the tubular shaft or is placed onto the tubular shaft and wherein the glass feed-through is integrally joined with the tubular connector piece of the first adapter component to form a structural unit,
wherein the glass feed-through is arranged, at least in regions, in the opening of the flange, and
wherein the first adapter component has an evacuation opening into which a dowel is inserted.

2. The mounting arrangement according to claim 1, further comprising:
a strain-relieving plug coupling,
wherein the glass feed-through is connected to the strain-relieving plug coupling.

3. The mounting arrangement according to claim 1, wherein the glass feed-through is integrally joined so as to be flush along an annular surface with the tubular connector piece.

4. The mounting arrangement according to claim 1, wherein the structural unit, including the glass feed-through together with the tubular connector piece, defines a fluid-tight inner tube volume in which a signal line is arranged between the glass feed-through and the measuring transducer.

5. The mounting arrangement according to claim 4, wherein the structural unit is at least partially inserted into the opening of the flange.

6. The mounting arrangement according to claim 1, wherein a filling volume of glass extends at least over 15% of a longitudinal extent of the glass feed-through.

7. A mounting arrangement, comprising:
a vibronic sensor, including:
a vibronic measuring sensor;
a connection to a measuring transducer;
a signal line between the vibronic measuring sensor and the measuring transducer; and
a glass feed-through for the signal line; and
a flange having an opening for transmitting signals through the flange,
wherein the vibronic measuring sensor and the connection to the measuring transducer are arranged on different sides of the flange,
wherein the glass feed-through is arranged, at least in regions, in the opening of the flange,
wherein the vibronic sensor further includes a tubular shaft that extends in or through the opening of the flange, wherein the tubular shaft includes a first adapter component having a tubular connector piece,
wherein the mounting arrangement is designed to be pressure-tight, and the glass feed-through is inserted into the tubular shaft, and
wherein the first adapter component has an evacuation opening into which a dowel is inserted.

* * * * *